United States Patent
Schlotterbach

(10) Patent No.: US 10,745,288 B2
(45) Date of Patent: Aug. 18, 2020

(54) PRODUCTION OF AMORPHOUS CALCIUM CARBONATE

(71) Applicant: Omya International AG, Oftringen (CH)

(72) Inventor: Thomas Schlotterbach, Villach (AT)

(73) Assignee: OMYA INTERNATIONAL AG, Oftringen (CH)

( * ) Notice: Subject to any disclaimer, the term of this patent is extended or adjusted under 35 U.S.C. 154(b) by 0 days.

(21) Appl. No.: 16/306,762

(22) PCT Filed: Jul. 20, 2017

(86) PCT No.: PCT/EP2017/068366
§ 371 (c)(1),
(2) Date: Dec. 3, 2018

(87) PCT Pub. No.: WO2018/019701
PCT Pub. Date: Feb. 1, 2018

(65) Prior Publication Data
US 2019/0135649 A1 May 9, 2019

Related U.S. Application Data

(60) Provisional application No. 62/367,756, filed on Jul. 28, 2016.

(30) Foreign Application Priority Data

Jul. 25, 2016 (EP) .................................. 16181006

(51) Int. Cl.
*C01F 11/18* (2006.01)
*C09C 3/08* (2006.01)
(Continued)

(52) U.S. Cl.
CPC ............ *C01F 11/181* (2013.01); *C09C 1/021* (2013.01); *C09C 3/08* (2013.01); *C01P 2002/02* (2013.01);
(Continued)

(58) Field of Classification Search
None
See application file for complete search history.

(56) References Cited

U.S. PATENT DOCUMENTS

| 4,237,147 A | 12/1980 | Merten et al. |
| 6,699,318 B1 * | 3/2004 | Virtanen ............... B82Y 30/00 |
| | | 106/463 |

FOREIGN PATENT DOCUMENTS

| CA | 1 186 550 A | 5/1985 |
| CN | 102 923 749 A | 2/2013 |

(Continued)

OTHER PUBLICATIONS

The International Search Report dated Oct. 17, 2017 from PCT/EP2017/068366.

(Continued)

*Primary Examiner* — Daniel Berns
(74) *Attorney, Agent, or Firm* — Fay Sharpe LLP

(57) ABSTRACT

The present invention relates to a process for preparing amorphous calcium carbonate, the amorphous calcium carbonate obtainable by the process, its use as well as a product comprising the amorphous calcium carbonate and the use of a spray dryer for the preparation of amorphous calcium carbonate.

20 Claims, 2 Drawing Sheets

(51) Int. Cl.
    *C09C 1/02*       (2006.01)
    *B01D 53/62*     (2006.01)
    *B01D 53/78*     (2006.01)
    *B01D 53/79*     (2006.01)
    *B01D 53/80*     (2006.01)
    *B01D 53/14*     (2006.01)

(52) U.S. Cl.
    CPC ...... *C01P 2002/72* (2013.01); *C01P 2004/03* (2013.01); *C01P 2004/50* (2013.01); *C01P 2004/62* (2013.01); *C01P 2004/64* (2013.01); *C01P 2006/12* (2013.01); *C01P 2006/82* (2013.01)

(56) References Cited

FOREIGN PATENT DOCUMENTS

| | | | | |
|---|---|---|---|---|
| CN | 102923749 | * | 2/2013 | ............. C01F 11/18 |
| EP | 2 722 368 A1 | | 4/2014 | |
| EP | 2 770 017 A1 | | 8/2014 | |
| WO | 98/41475 A1 | | 9/1998 | |
| WO | 2014/024191 A1 | | 2/2014 | |

OTHER PUBLICATIONS

The Written Opinion of the International Searching Authority dated Oct. 17, 2017 from PCT/EP2017/068366.

* cited by examiner

PRODUCTION OF AMORPHOUS CALCIUM CARBONATE

CROSS-REFERENCE TO RELATED APPLICATIONS

This is a U.S. national phase of PCT Application No. PCT/EP2017/068366, filed Jul. 20, 2017, which claims priority to U.S. Provisional Application No. 62/367,756, filed Jul. 28, 2016, and European Application No. 16181006.4, filed Jul. 25, 2016.

The present invention relates to a process for preparing amorphous calcium carbonate, the amorphous calcium carbonate obtainable by the process, its use as well as a product comprising the amorphous calcium carbonate and the use of a spray dryer for the preparation of amorphous calcium carbonate.

Calcium carbonate is one of the most commonly used additives in the paper, pharma, food, paints, sealants and plastic industries. While naturally occurring ground calcium carbonate (GCC) is usually used as a filler in many applications, synthetically manufactured precipitated calcium carbonate (PCC) may be tailor-made with respect to its morphology and particle size allowing these materials to fulfil additional functions.

The demand for new speciality mineral filler types is dramatically rising in recent years. In particular, speciality mineral filler types such as amorphous calcium carbonate (ACC) are of particular interest for use in various applications, e.g. pharma, food, paints, sealants, plastic applications etc.

Commonly known ACC processes are mainly based on applying controlled crystallisation from solution, e.g. mixing of sodium carbonate and calcium chloride and usage of different promoter or slaking additives to the final product in slurry form. In doing so, the lab-sized processing routes are complex, cost and energy intensive and feature a very low yield which makes an up-scaling to industrial processes impractical so far.

WO 98/41475 relates to a process, wherein $Ca(OH)_2$ is carbonated with gaseous $CO_2$, the carbonation being performed in gaseous phase by contacting the $Ca(OH)_2$ and liquid mist with $CO_2$ gas in a turbulence. The turbulence is created by at least two serially arranged pin mills. The residence time of the reaction is even less than 1 second, and due to the high energy intensity, the carbonation may be performed at high solids content.

WO 2014/024191 discloses a method for preparing stabilized ACC. The process comprises the steps of: i) combining an aqueous solution comprising a soluble calcium salt such as $CaCl_2$ and a first stabilizer with an aqueous solution comprising a soluble carbonate such as $Na_2CO_3$ so as to form an ACC suspension; and ii) adding a water miscible organic solvent and a solution comprising a second stabilizer, with the proviso that the second stabilizer and the organic solvent contact said ACC suspension within about 2 minutes of its formation.

U.S. Pat. No. 4,237,147 and CA 1 186 550 disclose stabilized ACC. The process for producing the stabilized ACC comprises: (1) forming an aqueous solution of calcium ions and a hydrogen bonding material (may be sucrose, fructose, etc.), (2) contacting the solution with $CO_2$, while maintaining the solution at a temperature below 15° C. to form a precipitate containing chemically bound water, and (3) reducing the amount of chemically bound water contained in the precipitate to below 15% by weight, while maintaining the resulting composition that is essentially free of unbound water. Step (3) can be drying in vacuum ovens, fluid bed dryers or by air drying in low humidity conditions.

However, due to the complex lab-sized, low yield manufacturing of the ACC described in the prior art, there is a continuous need for simplified processes which allow the direct production of ACC with high yield but without the usage of promoter or slaking additives.

Accordingly, it is an object of the present invention to provide a process for producing amorphous calcium carbonate. It is also desirable that said process does not require the usage of different promoter or slaking additives, such as amino-acids, co-block polymers, organic acids, organic acid salts, sugar alcohols, monosaccharides, disaccharides, polysaccharides, gluconates, phosphonates, lignosulphonates etc. It is also desirable that said process produces amorphous calcium carbonate at high purity, especially without the implementation of complex purification steps.

The foregoing and other objects are solved by the subject-matter as defined herein in the independent claims.

According to one aspect of the present invention, a process for preparing amorphous calcium carbonate is provided, the process comprising the steps of:

a) providing at least one calcium oxide containing material;

b) providing at least one gaseous $CO_2$ source, c) preparing a milk of lime by mixing the at least one calcium oxide containing material of step a) with water to convert the calcium oxide at least partially into dissolved calcium hydroxide, d) separating the dissolved calcium hydroxide in the milk of lime obtained in step c) from undissolved materials such as to obtain a solution of dissolved calcium hydroxide, e) drying the solution of dissolved calcium hydroxide obtained in step d), and f) carbonating the dissolved calcium hydroxide obtained in step d) with the at least one gaseous $CO_2$ source of step b) to convert the calcium hydroxide at least partially into amorphous calcium carbonate, wherein process steps e) and f) are carried out simultaneously.

According to another aspect, the present invention provides an amorphous calcium carbonate obtainable by the process defined herein.

According to still another aspect, the present invention provides a product comprising the amorphous calcium carbonate, as defined herein, preferably the product is a paper, a paper product, a wood product, cellulose composite, protein composite, bone composite, an ink, a paint, a coating, a plastic, a polymer composition, an adhesive, a building product, a foodstuff, an agricultural product, a biomimetic material, a cosmetic product or a pharmaceutical product.

According to still another aspect, the present invention provides the use of an amorphous calcium carbonate, as defined herein, in paper making, paper coating, food, plastic, agricultural, paint, coatings, adhesives, sealants, pharmaceuticals, agricultural, biomimetic, construction and/or cosmetic applications.

According to still another aspect, use of a spray dryer for the preparation of amorphous calcium carbonate is provided, wherein the amorphous calcium carbonate i) has an average particle size of 30 to 150 nm, more preferably from 40 to 120 nm and most preferably from 50 to 100 nm, and/or ii) has a moisture content of ≤10.0 wt.-%, preferably from 0.1 to 10.0 wt.-%, and most preferably from 0.2 to 8.0 wt.-%, based on the total dry weight of the amorphous calcium carbonate, and/or iii) has a specific BET surface area of 1.0 $m^2/g$ to 60.0 $m^2/g$, more preferably of 3.0 $m^2/g$ to 50.0 $m^2/g$ and most preferably of 10.0 $m^2/g$ to 40.0 $m^2/g$, and/or iv) forms aggregates, preferably aggregates having an average particle size in the range from 0.5 to 10 μm, preferably in the range from 1 to 8 μm and most preferably in the range from 1 to 5 μm, and/or v) is present in the form of deagglomerated particles.

Advantages embodiments of the present invention are defined in the corresponding sub-claims.

According to one embodiment of the present process, the at least one gaseous $CO_2$ source is a gaseous $CO_2$ comprising gas, preferably the at least one gaseous $CO_2$ source contains at least 20 vol.-%, based on the total volume of the gas, of $CO_2$.

According to another embodiment of the present process, step c) is carried out in that the at least one calcium oxide containing material is mixed with water in a weight ratio from 1:2 to 1:25, preferably from 1:2.5 to 1:20 and most preferably from 1:3 to 1:15 and/or in that the temperature of the water, which is used in step c), is adjusted to be in the range from >0° C. and <100° C., preferably from 1° C. to 70° C., more preferably from 2° C. to 50° C., even more preferably from 30° C. to 50° C., and most preferably from 35° C. to 45° C.

According to yet another embodiment of the present process, the process further comprises a step of removing particles having an average particle size of >100 μm from the milk of lime obtained in step c) before separating step d) is carried out.

According to one embodiment of the present process, the milk of lime obtained in step c) has a Brookfield viscosity from 1 to 1 000 mPa·s at 25° C., more preferably from 5 to 800 mPa·s at 25° C., and most preferably from 10 to 600 mPa·s at 25° C.; and/or solids content in the range from 5.0 to 40.0 wt.-%, preferably from 6.0 to 30.0 wt.-%, and most preferably from 8.0 to 20.0 wt.-%, based on the total weight of the milk of lime.

According to another embodiment of the present process, separating step d) is carried out via mechanical separation techniques, preferably in a vertical plate pressure filter, a tube press or a vacuum filter, more preferably in a vacuum filter such as a vacuum suction filter.

According to yet another embodiment of the present process, the solution of dissolved calcium hydroxide obtained in step d) is adjusted to a temperature in the range from 10° C. and less than 60° C., preferably from 10° C. to 50° C., more preferably from 12° C. to 40° C., even more preferably from 14° C. to 30° C., and most preferably from 15° C. to 28° C.

According to one embodiment of the present process, drying step e) and carbonating step f) are carried out in a spray drier.

According to another embodiment of the present process, drying step e) and carbonating step f) are carried out at an inlet temperature in the range from 50° C. to 400° C., preferably from 100° C. to 375° C., more preferably from 150° C. to 350° C. and most preferably from 200° C. to 300° C.

According to yet another embodiment of the present process, the carbonating in step f) is carried out at a gas pressure of 1 to 20 bar, preferably of 1 to 15 bar and most preferably of 2 to 10 bar.

According to one embodiment of the present process, the amorphous calcium carbonate i) has an average particle size of 30 to 150 nm, more preferably from 40 to 120 nm and most preferably from 50 to 100 nm, and/or ii) has a moisture content of ≤10.0 wt.-%, preferably from 0.1 to 10.0 wt.-%, and most preferably from 0.2 to 8.0 wt.-%, based on the total dry weight of the amorphous calcium carbonate, and/or iii) has a specific BET surface area of 1.0 $m^2/g$ to 60.0 $m^2/g$, more preferably of 3.0 $m^2/g$ to 50.0 $m^2/g$ and most preferably of 10.0 $m^2/g$ to 40.0 $m^2/g$, and/or iv) forms aggregates, preferably aggregates having an average particle size in the range from 0.5 to 10 μm, preferably in the range from 1 to 8 μm and most preferably in the range from 1 to 5 μm, and/or v) is present in the form of deagglomerated particles.

It should be understood that for the purpose of the present invention, the following terms have the following meaning:

A "calcium oxide containing material" in the meaning of the present invention can be a mineral or a synthetic material having a content of calcium oxide of at least 50 wt.-%, preferably 75 wt.-%, more preferably 90 wt.-%, and most preferably 95 wt.-%, based on the total weight of the calcium oxide containing material. For the purpose of the present invention, a "mineral material" is a solid substance having a definite inorganic chemical composition and characteristic crystalline and/or amorphous structure.

The term "amorphous calcium carbonate" refers to a metastable calcium carbonate containing a varying amount of water, which transforms into calcite at high temperatures, i.e. of above 300° C. This transformation is accelerated in the presence of water such that this process can be already observed at lower temperatures.

The term "amorphous" calcium carbonate shall mean that the calcium carbonate does not show a crystalline morphology when analysed by known means of investigating a material's morphological state. For instance, the calcium carbonate is considered to be amorphous if it does not show any X-ray pattern upon X-ray analysis and shows only one refractive index upon subjecting the material to refractive index analysis.

The term "solution" in the meaning of the present invention refers to systems in which no discrete solid particles are observed in the solvent.

The term "suspension" in the meaning of the present invention comprises essentially insoluble solids in the solvent and optionally further additives and usually contains large amounts of solids and, thus, is more viscous and generally of higher density than the liquid from which it is formed. However, the term "essentially insoluble" does not exclude that at least a part of the solids material dissolves in the solvent under certain conditions.

Unless specified otherwise, the term "drying" refers to a process according to which at least a portion of water is removed from the material to be dried such that a constant weight of the obtained "dried" material at 120° C. is reached. Moreover, a "dried" material may be further defined by its moisture content which, unless specified otherwise, is ≤10.0 wt.-%, preferably from 0.1 to 10.0 wt.-%, and most preferably from 0.2 to 8.0 wt.-%, based on the total dry weight of the dried material. The "moisture content" of a material refers to the percentage of moisture (i.e. water) which may be desorbed from a sample upon heating to 220° C.

A "specific BET surface area" (SSA) in the meaning of the present invention is defined as the surface area of the amorphous calcium carbonate particles divided by the mass of ACC particles. As used therein the specific surface area is measured by adsorption using the BET isotherm (ISO 9277: 2010) and is specified in $m^2/g$.

For the purpose of the present invention, the term "viscosity" or "Brookfield viscosity" refers to Brookfield viscosity.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This, for example, means that, unless the context clearly dictates otherwise, the term "obtained" does not mean to indicate that, e.g. an embodiment must be obtained by, e.g. the sequence of steps following the term "obtained" even though such a limited understanding is always included by the terms "obtained" or "defined" as a preferred embodiment.

The inventive process for preparing amorphous calcium carbonate comprises the steps of: a) providing at least one calcium oxide containing material; b) providing at least one gaseous $CO_2$ source; c) preparing a milk of lime by mixing the at least one calcium oxide containing material of step a) with water to convert the calcium oxide at least partially into dissolved calcium hydroxide; d) separating the dissolved calcium hydroxide in the milk of lime obtained in step c) from undissolved materials such as to obtain a solution of dissolved calcium hydroxide; e) drying the solution of dissolved calcium hydroxide obtained in step d); and f) carbonating the dissolved calcium hydroxide obtained in step d) with the at least one gaseous $CO_2$ source of step b) to convert the calcium hydroxide at least partially into amorphous calcium carbonate, wherein process steps e) and f) are carried out simultaneously.

In the following details and preferred embodiments of the inventive process will be set out in more details. It is to be understood that these technical details and embodiments also apply to the inventive uses as well as to the inventive products.

Process Step a)

In step a) of the process of the present invention, at least one calcium oxide containing material is provided.

The term "at least one" calcium oxide containing material in the meaning of the present invention means that the calcium oxide containing material comprises, preferably consists of, one or more calcium oxide containing material(s).

In one embodiment of the present invention, the at least one calcium oxide containing material comprises, preferably consists of, one calcium oxide containing material. Alternatively, the at least one calcium oxide containing material comprises, preferably consists of, two or more calcium oxide containing materials. For example, the at least one calcium oxide containing material comprises, preferably consists of, two or three calcium oxide containing materials.

Preferably, the at least one calcium oxide containing material comprises, more preferably consists of, one calcium oxide containing material.

The calcium oxide containing material of step a) can be obtained by calcining a calcium carbonate containing material. Calcination is a thermal treatment process applied to calcium carbonate containing materials in order to bring about a thermal decomposition resulting in the formation of calcium oxide and gaseous carbon dioxide. Calcium carbonate containing materials which may be used in such a calcinations process are those selected from the group comprising precipitated calcium carbonates; natural calcium carbonate containing minerals such as marble, limestone and chalk, and mixed alkaline earth carbonate minerals comprising calcium carbonate such as dolomite, or calcium carbonate rich fractions from other sources. It is also possible to subject a calcium carbonate containing waste material to a calcination process in order to obtain a calcium oxide containing material.

Calcium carbonate decomposes at about 1 000° C. to calcium oxide (commonly known as quicklime). The calcination step may be carried out under conditions and using equipment well-known to the person skilled in the art. Generally, calcination may be carried out in furnaces or reactors (sometimes referred to as kilns) of various designs including shaft furnaces, rotary kilns, multiple hearth furnaces, and fluidized bed reactors.

The end of the calcination reaction may be determined, e.g. by monitoring the density change, the residual carbonate content, e.g. by X-ray diffraction, or the slaking reactivity by common methods.

According to one embodiment of the present invention, the calcium oxide containing material of step i) is obtained by calcining a calcium carbonate containing material, preferably selected from the group consisting of precipitated calcium carbonate, natural calcium carbonate minerals such as marble, limestone and chalk, mixed alkaline earth carbonate minerals comprising calcium carbonate such as dolomite, and mixtures thereof.

For reasons of efficiency, it is preferred that the calcium oxide containing material has a minimum calcium oxide content of at least 50 wt.-%, preferably 75 wt.-%, and more preferably 90 wt.-%, based on the total weight of the calcium oxide containing material. For example, the calcium oxide containing material has a minimum calcium oxide content of at least 95 wt.-%, based on the total weight of the calcium oxide containing material. According to one embodiment, the calcium oxide containing material consists of calcium oxide.

The calcium oxide containing material can be used in the inventive process in its original form, i.e. as a raw material, for example, in form of smaller and bigger chunks. Alternatively, the calcium oxide containing material can be ground before use. According to one embodiment of the present invention, the calcium oxide containing material is in form of particles having a weight median particle size $d_{50}$ from 0.1 to 1 000 μm, and preferably from 1 to 500 μm.

The "particle size" of the calcium oxide containing material is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{98}$ value is also designated as "top cut". The $d_{50}$ value is thus the weight median particle size, i.e. 50 wt.-% of all grains are bigger and the remaining 50 wt.-% of grains smaller than this particle size. For determining the weight median particle size $d_{50}$ value or the top cut particle size $d_{98}$ value a Sedigraph 5100 or 5120 device from the company Micromeritics, USA, can be used.

Process Step b)

In step b) of the process of the present invention, at least one gaseous $CO_2$ source is provided.

The term "at least one" gaseous $CO_2$ source in the meaning of the present invention means that the gaseous $CO_2$ source comprises, preferably consists of, one or more gaseous $CO_2$ source(s).

In one embodiment of the present invention, the at least one gaseous $CO_2$ source comprises, preferably consists of, one gaseous $CO_2$ source. Alternatively, the at least one gaseous $CO_2$ source comprises, preferably consists of, two or more gaseous $CO_2$ sources. For example, the at least one gaseous $CO_2$ source comprises, preferably consists of, two or three gaseous $CO_2$ sources.

Preferably, the at least one gaseous $CO_2$ source comprises, more preferably consists of, one gaseous $CO_2$ source.

In one embodiment of the present invention, the at least one gaseous $CO_2$ source is a gaseous $CO_2$ comprising gas. Thus, the at least one gaseous $CO_2$ source is preferably a gaseous mixture of carbon dioxide and other gases such as carbon dioxide containing flue gases exhausted from industrial processes like combustion processes or calcination processes or alike, or the at least one gaseous $CO_2$ source is gaseous carbon dioxide. Accordingly, the at least one gaseous $CO_2$ source preferably contains at least 20 vol.-%, based on the total volume of the gas, of $CO_2$. When a gaseous mixture of carbon dioxide and other gases is used, then the carbon dioxide is present in the range of 20 to about 99% by volume, preferably in the range of 50 to 99% by volume, more preferably 70 to 99% by volume, even more preferably 90 to 99% by volume and most preferably 95 to 99% by volume, based on the total volume of the gaseous mixture. For example, the carbon dioxide is present in an amount of at least 97% by volume, based on the total volume of the gaseous mixture.

Preferably, the at least one gaseous $CO_2$ source is gaseous carbon dioxide, i.e. the at least one gaseous $CO_2$ source consists of gaseous carbon dioxide.

In one embodiment, the at least one gaseous $CO_2$ source is provided at a gas pressure of 1 to 20 bar, preferably of 1 to 15 bar and most preferably of 2 to 10 bar.

Additionally or alternatively, the at least one gaseous $CO_2$ source is provided at a feed rate of 275 to 400 l/h, more preferably of 300 to 350 l/h.

Process Step c)

In step c) of the process of the present invention, a milk of lime is prepared by mixing the at least one calcium oxide containing material of step a) with water to convert the calcium oxide at least partially into dissolved calcium hydroxide.

The reaction of the at least one calcium oxide containing material with water results in the formation of a milky calcium hydroxide suspension, better known as milk of lime. Said reaction is highly exothermic and is also designated as "lime slaking" in the art.

According to one embodiment of the present invention, the temperature of the water, which is used in step c), i.e. the temperature of the water that is used to slake the calcium oxide containing material, is adjusted to be in the range from more than 0° C. and less than 100° C. In other words, the water that is used to slake the at least one calcium oxide containing material is adjusted to a temperature range, in which the water is in liquid form. Preferably, the temperature of the water, which is used in step c) is adjusted to be in the range from >0° C. and <100° C., preferably from 1° C. to 70° C., more preferably from 2° C. to 50° C., even more preferably from 30° C. to 50° C., and most preferably from 35° C. to 45° C. It will be apparent to the skilled person that the initial temperature of the water is not necessarily the same one as the temperature of the mixture prepared in step c) due to the highly exothermic slaking reaction and/or due to the mixing of substances having different temperatures.

According to the present invention, the at least one calcium oxide containing material and the water are mixed in a weight ratio from 1:2 to 1:25 and preferably from 1:2.5 to 1:20. According to one preferred embodiment, in step c) the at least one calcium oxide containing material and the water are mixed in a weight ratio from 1:3 to 1:15.

Most preferably, the at least one calcium oxide containing material and the water are mixed in a weight ratio from 1:5 to 1:10.

Process Step c) may be performed at room temperature, i.e. at a temperature of 20° C.±2° C., or at an initial temperature of 30 to 50° C., preferably 35 to 45° C. Since the reaction is exothermic, the temperature typically raises to a temperature between 85 and 99° C. during step c), preferably to a temperature between 90 and 95° C. According to a preferred embodiment, process step c) is performed with mixing, agitation, or stirring, for example, mechanical stirring. Suitable process equipment for mixing, agitation or stirring is known to the skilled person.

The progress of the preparation of the milk of lime may be observed by measuring the temperature and/or conductivity of the reaction mixture. It can also be monitored by turbidity control. Alternatively or additionally, the progress of the preparation of the milk of lime can be inspected visually.

It is appreciated that a milk of lime is obtained in process step c). Accordingly, it is one requirement of the present invention that the calcium oxide of the at least one calcium oxide containing material is at least partially converted into dissolved calcium hydroxide.

The milk of lime obtained in process step c) is an aqueous suspension, i.e. an aqueous suspension comprising dissolved calcium hydroxide.

According to one embodiment of the present invention, the milk of lime obtained in step c) has solids content in the range from 5.0 to 40.0 wt.-%, preferably from 6.0 to 30.0 wt.-%, and most preferably from 8.0 to 20.0 wt.-%, based on the total weight of the milk of lime.

Additionally or alternatively, the milk of lime obtained in step c) has a Brookfield viscosity from 1 to 1 000 mPa·s at 25° C., more preferably from 5 and 800 mPa·s at 25° C., and most preferably from 10 and 600 mPa·s at 25° C. According to one embodiment, the Brookfield viscosity is measured at 100 rpm.

It is within the confines of the present invention that additional water may be introduced during process step c) in order to control and/or maintain and/or achieve the desired solids content or Brookfield viscosity of the milk of lime.

Process Step c) can be carried out in form of a batch process, a semi-continuous or a continuous process.

The process of the present invention is especially advantageous as no promoter or slaking additives have to be added before and/or during and/or after any one of process steps c), d), e) and/or f) in order to control the size of the ACC particles and their particle morphology.

Thus, it is appreciated that the process for preparing amorphous calcium carbonate of the present invention does not comprise a step of adding slaking additives, such as amino-acids, co-block polymers, organic acids, organic acid salts, sugar alcohols, monosaccharides, disaccharides, polysaccharides, gluconates, phosphonates, lignosulphonates etc., before and/or during and/or after any one of process steps c), d), e) and/or f). For example, the process of the present invention does not comprise a step of adding slaking additives, such as amino-acids, co-block polymers, organic acids, organic acid salts, sugar alcohols, monosaccharides, disaccharides, polysaccharides, gluconates, phosphonates, lignosulphonates etc., before and/or during and/or after any one of process steps c), d), e) or f). Alternatively, the process of the present invention does not comprise a step of adding slaking additives, such as amino-acids, co-block polymers, organic acids, organic acid salts, sugar alcohols, monosaccharides, disaccharides, polysaccharides, gluconates, phosphonates, lignosulphonates etc., before and/or during and/or after any one of process steps c), d), e) and f).

It is appreciated that the process of the present invention may comprise a step of removing large particles from the milk of lime obtained in step c). Thus, in one embodiment, the present process comprises a step of removing particles having an average particle size of >100 μm from the milk of lime obtained in step c) before separating step d) is carried out.

For the purpose of the present invention, the expression "removing" means that undissolved materials exceeding a particular size are removed from the milk of lime obtained in step c) of the inventive process.

This removing step results in a coarse fraction (i.e. average particle size of >100 μm) and a fine fraction (i.e. average particle size of ≤100 μm), wherein the coarse fraction is removed and the fine fraction is used in the following process steps. Such removing step of large particles is advantageous in order to improve the efficiency in the following process steps.

In case the large particles are removed from the milk of lime obtained in step c), this removing may be achieved by any conventional means known to the skilled person for removing particles having an average particle size of >100 μm from a milk of lime. For example, such removing may be achieved by screening or sedimentation and decanting, and/or filtration, preferably by screening using a 100 μm screen.

According to one embodiment of the present invention, the milk of lime obtained in step c), after removing large particles from the milk of lime, has preferably a solids content in the range from 5.0 to 40.0 wt.-%, more preferably from 6.0 to 30.0 wt.-%, and most preferably from 8.0 to 20.0 wt.-%, based on the total weight of the milk of lime.

Additionally or alternatively, the milk of lime obtained in step c), after removing large particles from the milk of lime, has a Brookfield viscosity from 1 to 1 000 mPa·s at 25° C., more preferably from 5 and 800 mPa·s at 25° C., and most preferably from 10 and 600 mPa·s at 25° C. According to one embodiment, the Brookfield viscosity is measured at 100 rpm.

Process Step d)

In step d) of the process of the present invention, the dissolved calcium hydroxide in the milk of lime obtained in step c) is separated from undissolved materials such as to obtain a solution of dissolved calcium hydroxide.

For the purpose of the present invention, the expression "separating" means that the undissolved materials are removed or isolated from the milk of lime obtained in step c) of the inventive process. The undissolved materials may be separated from the milk of lime obtained in step c) by any conventional means of separation known to the skilled person.

It is appreciated that separating step d) is preferably carried out via mechanical separation techniques. The mechanical separation techniques may be any kind of mechanical separation technique known to the skilled person and typically used for filtering aqueous suspensions comprising minerals, pigments and/or fillers. For example, separating step d) is carried out in a vertical plate pressure filter, a tube press or a vacuum filter.

In order to efficiently separate the dissolved calcium hydroxide in the milk of lime obtained in step c) from undissolved materials, it is especially advantageous that process step d) is carried out in a vacuum filter. Preferably, in a vacuum filter such as a vacuum suction filter.

It is appreciated that a solution of dissolved calcium hydroxide is obtained in process step d). That is to say, in process step d) a clear solution of dissolved calcium hydroxide is obtained.

It is preferred that the solution of dissolved calcium hydroxide obtained in step d) is adjusted to a specific temperature before process steps e) and f) are carried out in order to improve the drying as well as carbonating efficiency in the following process steps.

Thus, it is preferred that the solution of dissolved calcium hydroxide obtained in step d) is adjusted to a temperature in the range from 10° C. and less than 60° C., preferably from 10° C. to 50° C., more preferably from 12° C. to 40° C., even more preferably from 14° C. to 30° C., and most preferably from 15° C. to 28° C.

Process steps e) and f) In process step e), the solution of dissolved calcium hydroxide obtained in step d) is dried. In process step f), the dissolved calcium hydroxide obtained in step d) is carbonated with the at least one gaseous $CO_2$ source of step b) to convert the calcium hydroxide at least partially into amorphous calcium carbonate.

It is one requirement of the present process that drying step e) and carbonating step f) are carried out simultaneously. This process management provides the advantage that amorphous calcium carbonate can be obtained, and especially stable calcium carbonate at high purity, in a simple manner without the use of complex purification steps.

In view of the above, it is appreciated that the drying step e) and the carbonating step f) according to the process of the present invention may be carried out by any means known to the skilled person being suitable for simultaneous drying and carbonating of a material. For example, drying step e) and carbonating step f) are carried out in a spray dryer.

In said drying step, the solution of dissolved calcium hydroxide obtained in step d) is dried to obtain dried calcium hydroxide.

According to one embodiment of the present invention, in step f) the carbonation is carried out by contacting the dissolved calcium hydroxide obtained in step d) with the at least one gaseous $CO_2$ source containing at least 20 vol.-%, based on the total volume of the gas, of $CO_2$.

For example, the solution of dissolved calcium hydroxide obtained in step d) is dried and carbonated in process steps e) and f) at an inlet temperature in the range from 50° C. to 400° C., preferably from 100° C. to 375° C., more preferably from 150° C. to 350° C. and most preferably from 200° C. to 300° C.

According to one embodiment, drying step e) and carbonating step f) are carried out in a spray dryer, preferably said drying step e) and carbonating step f) are carried out in a spray dryer at an inlet temperature in the range from 50° C. to 400° C., preferably from 100° C. to 375° C., more preferably from 150° C. to 350° C. and most preferably from 200° C. to 300° C.

It is appreciated that the conversion into amorphous calcium carbonate is especially efficient if carbonating step f) is carried out a specific gas pressure. Thus, the carbonating in step f) is preferably carried out at a gas pressure of 1 to 20 bar, preferably of 1 to 15 bar and most preferably of 2 to 10 bar.

Process steps e) and f) can be carried out in form of a batch process, a semi-continuous or a continuous process. According to one embodiment, the process of the present invention involving the process steps a) to f) is carried out in form of a batch process, a semi-continuous or a continuous process.

As already mentioned above, the inventors surprisingly found that the simultaneous drying and carbonating of a solution of dissolved calcium hydroxide allows the preparation of ACC in a process which avoids the addition of promoter or slaking additives. It was also found that this process allows the preparation of ACC with high purity without the usage of complex purification steps.

According to one embodiment of the present invention, the obtained amorphous calcium carbonate has an average particle size of 30 to 150 nm, more preferably from 40 to 120 nm and most preferably from 50 to 100 nm.

It is appreciated that the amorphous calcium carbonate obtained by the process according to the present invention can be present in the form of deagglomerated particles. Such deagglomerated amorphous calcium carbonate particles preferably have an average particle size of 30 to 150 nm, more preferably from 40 to 120 nm and most preferably from 50 to 100 nm.

The term "deagglomerating" in the meaning of the present invention refers to the breaking up of agglomerates which may have formed during the drying step and carbonating step.

Such deagglomerating can be carried out by any means known for deagglomerating agglomerated solid materials. According to one embodiment, the deagglomerating may be carried out in a cell mill as known by the skilled person. Preferably said deagglomerating is carried out at a temperature ranging from 50 and 150° C., preferably from 60 to 130° C. and most preferably from 80 to 125° C.

In view of the above, it is appreciated that the amorphous calcium carbonate obtained by the process according to the present invention can be present in the form of agglomerates. Such agglomerates preferably have an average particle size in the range from 0.5 to 10 μm, preferably in the range from 1 to 8 μm and most preferably in the range from 1 to 5 μm.

The BET specific surface area of the amorphous calcium carbonate obtained by the process according to the present invention, preferably of the deagglomerated particles, may be from 1.0 m$^2$/g to 60.0 m$^2$/g, more preferably from 3.0 m$^2$/g to 50.0 m$^2$/g and most preferably from 10.0 m$^2$/g to 40.0 m$^2$/g, measured using nitrogen and the BET method according to ISO 9277. The BET specific surface area of the amorphous calcium carbonate obtained by the process of the present invention may be controlled by the use of additives, e.g. surface active agents, but also the conditions chosen during simultaneous drying and carbonating.

As the amorphous calcium carbonate is obtained from a simultaneous step of drying and carbonating, the amorphous calcium carbonate typically has low moisture content. According to one embodiment of the present invention, the obtained amorphous calcium carbonate has a moisture content of ≤10.0 wt.-%, preferably from 0.1 to 10.0 wt.-%, and most preferably from 0.2 to 8.0 wt.-%, based on the total dry weight of the amorphous calcium carbonate.

The amorphous calcium carbonate obtained by the inventive process can be post-treated, for example, after drying and carbonating steps e) and f) with an additional component such as a surface treatment agent.

The surface treatment agent used may be any agent known to the skilled person which is capable to form a hydrophobic treatment layer on at least a part of the accessible surface area of the amorphous calcium carbonate particles.

For example, the amorphous calcium carbonate particles obtained after drying and carbonating steps e) and f) can be treated with at least one mono-substituted succinic anhydride and/or with at least one phosphoric acid ester blend and suitable compounds for coating are described in EP 2 722 368 A1 and EP 2 770 017 A1, which are thus incorporated herewith by references.

Suitable aliphatic carboxylic acids for treating the amorphous calcium carbonate particles obtained after drying and carbonating steps e) and f) are for example aliphatic linear or branched carboxylic acids having between 4 and 24 carbon atoms.

The aliphatic linear or branched carboxylic acid in the meaning of the present invention may be selected from one or more straight chain, branched chain, saturated, unsaturated and/or alicyclic carboxylic acids. Preferably, the aliphatic linear or branched carboxylic acid is a monocarboxylic acid, i.e. the aliphatic linear or branched carboxylic acid is characterised in that a single carboxyl group is present. Said carboxyl group is placed at the end of the carbon skeleton.

In one embodiment of the present invention, the aliphatic linear or branched carboxylic acid is selected from saturated unbranched carboxylic acids, that is to say the aliphatic linear or branched carboxylic acid is preferably selected from the group of carboxylic acids consisting of butanoic acid, pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosanoic acid, behenic acid, tricosanoic acid, lignoceric acid and mixtures thereof.

In another embodiment of the present invention, the aliphatic linear or branched carboxylic acid is selected from the group consisting of octanoic acid, decanoic acid, lauric acid, myristic acid, palmitic acid, stearic acid, arachidic acid and mixtures thereof. Preferably, the aliphatic linear or branched carboxylic acid is selected from the group consisting of myristic acid, palmitic acid, stearic acid and mixtures thereof.

For example, the aliphatic linear or branched carboxylic acid is stearic acid.

Thus, the process for preparing amorphous calcium carbonate preferably may comprise the steps of:
a) providing at least one calcium oxide containing material;
b) providing at least one gaseous $CO_2$ source,
c) preparing a milk of lime by mixing the at least one calcium oxide containing material of step a) with water to convert the calcium oxide at least partially into dissolved calcium hydroxide,
d) separating the dissolved calcium hydroxide in the milk of lime obtained in step c) from undissolved materials such as to obtain a solution of dissolved calcium hydroxide,
e) drying the solution of dissolved calcium hydroxide obtained in step d), and f) carbonating the dissolved calcium hydroxide obtained in step d) with the at least one gaseous $CO_2$ source of step b) to convert the calcium hydroxide at least partially into amorphous calcium carbonate, g) treating the particles of the amorphous calcium carbonate obtained in steps e) and f) with a surface treatment agent, wherein process steps e) and f) are carried out simultaneously.

In one embodiment, the process for preparing amorphous calcium carbonate consists of the steps:

a) providing at least one calcium oxide containing material;

b) providing at least one gaseous $CO_2$ source, c) preparing a milk of lime by mixing the at least one calcium oxide containing material of step a) with water to convert the calcium oxide at least partially into dissolved calcium hydroxide, d) separating the dissolved calcium hydroxide in the milk of lime obtained in step c) from undissolved materials such as to obtain a solution of dissolved calcium hydroxide, e) drying the solution of dissolved calcium hydroxide obtained in step d), and f) carbonating the dissolved calcium hydroxide obtained in step d) with the at least one gaseous $CO_2$ source of step b) to convert the calcium hydroxide at least partially into amorphous calcium carbonate, wherein process steps e) and f) are carried out simultaneously.

Alternatively, the process for preparing amorphous calcium carbonate consists of the steps:

a) providing at least one calcium oxide containing material;

b) providing at least one gaseous $CO_2$ source, c) preparing a milk of lime by mixing the at least one calcium oxide containing material of step a) with water to convert the calcium oxide at least partially into dissolved calcium hydroxide, d) separating the dissolved calcium hydroxide in the milk of lime obtained in step c) from undissolved materials such as to obtain a solution of dissolved calcium hydroxide, e) drying the solution of dissolved calcium hydroxide obtained in step d), and f) carbonating the dissolved calcium hydroxide obtained in step d) with the at least one gaseous $CO_2$ source of step b) to convert the calcium hydroxide at least partially into amorphous calcium carbonate, g) treating the particles of the amorphous calcium carbonate obtained in steps e) and f) with a surface treatment agent, wherein process steps e) and f) are carried out simultaneously.

Products and their Use

According to the present invention, an amorphous calcium carbonate is provided, which is obtainable by a process comprising the steps of:

a) providing at least one calcium oxide containing material;

b) providing at least one gaseous $CO_2$ source, c) preparing a milk of lime by mixing the at least one calcium oxide containing material of step a) with water to convert the calcium oxide at least partially into dissolved calcium hydroxide, d) separating the dissolved calcium hydroxide in the milk of lime obtained in step c) from undissolved materials such as to obtain a solution of dissolved calcium hydroxide, e) drying the solution of dissolved calcium hydroxide obtained in step d), and f) carbonating the dissolved calcium hydroxide obtained in step d) with the at least one gaseous $CO_2$ source of step b) to convert the calcium hydroxide at least partially into amorphous calcium carbonate, wherein process steps e) and f) are carried out simultaneously.

With regard to the definition of the process, the amorphous calcium carbonate and preferred embodiments thereof, reference is made to the statements provided above when discussing the technical details of the process of the present invention.

The amorphous calcium carbonate obtained by the process of the present invention may be used in various materials. According to one embodiment of the present invention, the amorphous calcium carbonate according to the present invention is used in paper making, paper coating, food, plastic, agricultural, paint, coatings, adhesives, sealants, pharmaceuticals, agricultural, biomimetic, construction and/or cosmetic applications.

According to one aspect of the present invention, a product comprising the amorphous calcium carbonate according to the present invention is provided. According to a preferred embodiment, the product is a paper, a paper product, a wood product, cellulose composite, protein composite, bone composite, an ink, a paint, a coating, a plastic, a polymer composition, an adhesive, a building product, a foodstuff, an agricultural product, a biomimetic material, a cosmetic product or a pharmaceutical product.

According to another aspect of the present invention, the use of a spray dryer for the preparation of amorphous calcium carbonate is provided. The amorphous calcium carbonate i) has an average particle size of 30 to 150 nm, more preferably from 40 to 120 nm and most preferably from 50 to 100 nm, and/or ii) has a moisture content of ≤10.0 wt.-%, preferably from 0.1 to 10.0 wt.-%, and most preferably from 0.2 to 8.0 wt.-%, based on the total dry weight of the amorphous calcium carbonate, and/or iii) has a specific BET surface area of 1.0 $m^2/g$ to 60.0 $m^2/g$, more preferably of 3.0 $m^2/g$ to 50.0 $m^2/g$ and most preferably of 10.0 $m^2/g$ to 40.0 $m^2/g$, and/or iv) forms aggregates, preferably aggregates having an average particle size in the range from 0.5 to 10 μm, preferably in the range from 1 to 8 μm and most preferably in the range from 1 to 5 μm, and/or v) is present in the form of deagglomerated particles.

Figure 1:
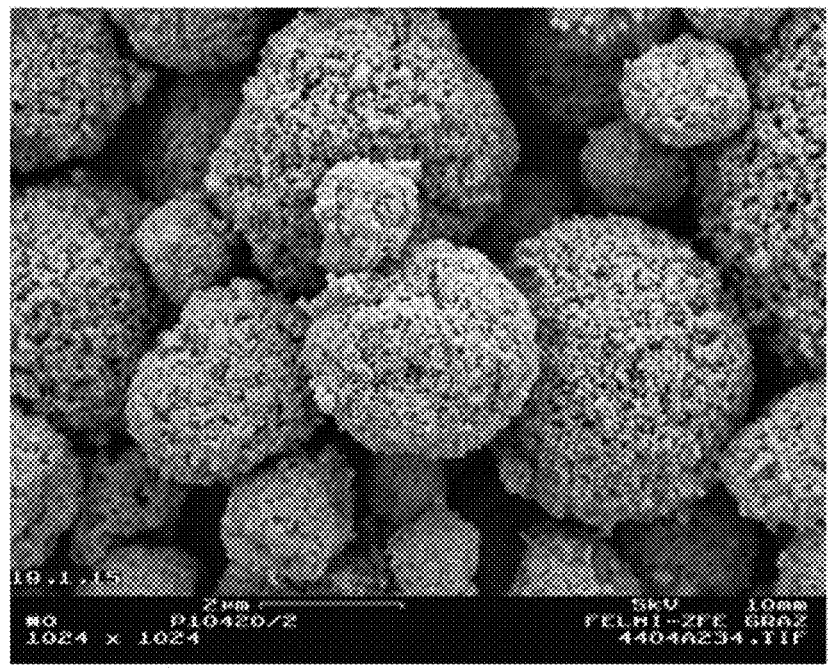
FIG. 1 refers to a SEM image of amorphous calcium carbonate aggregates.

The scope and interest of the present invention will be better understood based on the following figures and examples which are intended to illustrate certain embodiments of the present invention and are non-limitative.

EXAMPLES

1. Measurement Methods

In the following, measurement methods implemented in the examples are described.

Brookfield Viscosity

For the purpose of the present invention, the term "viscosity" or "Brookfield viscosity" refers to Brookfield viscosity. The Brookfield viscosity is for this purpose measured by a Brookfield DV-III Ultra viscometer at 24° C.±3° C. at 100 rpm using an appropriate spindle of the Brookfield RV-spindle set and is specified in mPa·s. Once the spindle has been inserted into the sample, the measurement is started with a constant rotating speed of 100 rpm. The reported Brookfield viscosity values are the values displayed 60 s after the start of the measurement. Based on his technical knowledge, the skilled person will select a spindle from the Brookfield RV-spindle set which is suitable for the viscosity range to be measured. For example, for a viscosity range between 200 and 800 mPa·s the spindle number 3 may be used, for a viscosity range between 400 and 1 600 mPa·s the spindle number 4 may be used, for a viscosity range between 800 and 3 200 mPa·s the spindle number 5 may be used, for a viscosity range between 1 000 and 2 000 000 mPa·s the spindle number 6 may be used, and for a viscosity range between 4 000 and 8 000 000 mPa·s the spindle number 7 may be used.

Average Particle Size

The average particle size of the amorphous calcium carbonate was determined by SEM. SEM images were obtained by using a Zeiss Gemini DSM 982.

Specimen Preparation (Powder):

Specimen preparation was carried out by spreading the powder material onto an SEM stub using double-sided adhesive tape. In order to accomplish an electrically conductive surface, the specimen was sputter coated with a thin layer of gold/palladium alloy.

Image Formation in Scanning Electron Microscopy SEM:

The electrons originate from cathode are accelerated toward the sample and focused by electromagnetic lenses. When those fast and high-energy primary electrons hit the sample surface, interaction processes take place. Different signals are released: secondary electrons (essentially topographic contrast) and backscattered electrons (essentially compositional contrast: higher mean atomic number δ higher brightness) are used for imaging the surface, X-rays provide an insight into the chemical composition.

For the standard SEM investigation of amorphous calcium carbonate only secondary electrons images were obtained.

The average particle size obtained by SEM refers to the average of 300 particles.

Solids Content of an Aqueous Suspension

The suspension solids content (also known as "dry weight") was determined using a Moisture Analyser MJ33 from the company Mettler-Toledo, Switzerland, with the following settings: drying temperature of 160° C., automatic switch off if the mass does not change more than 1 mg over a period of 30 s, standard drying of 5 to 20 g of suspension.

Specific Surface Area (SSA)

The specific surface area was measured via the BET method according to ISO 9277 using nitrogen, following conditioning of the sample by heating at 250° C. for a period of 30 min. Prior to such measurements, the sample is filtered within a Büchner funnel, rinsed with deionised water and dried overnight at 90 to 100° C. in an oven. Subsequently the dry cake is ground thoroughly in a mortar and the resulting powder placed in a moisture balance at 130° C. until a constant weight is reached.

Powder X-Ray Diffraction (XRD)

The dried ACC powder was monitored with a Bruker D8 X-ray diffractometer, equipped with Cu K-alpha radiation and a LynxEye position sensitive device (PSD). XRD measurement conditions were 40 kV, 40 mA, by using a variable 6.00 mm divergence slit width. 2-Theta-angle was 4-70°, the step size was 0.009° with 0.2 seconds per step. All samples were prepared according to the top-load technique and measured with sample rotation.

2. Examples

Example 1

1 000 g of PCC grade high-purity quicklime CaO from Austria was added to 5 l of 40° C. tap water in a stirred slaking vessel. The quicklime was slaked for 30 min under continuous stirring and the resulting slurry of hydrated calcium oxide ("milk of lime") was then screened on a 100 μm screen to remove grit.

The subsequent separation of the dissolved calcium hydroxide containing supernatant was conducted via a vacuum suction filter (Büchner funnel) using a filter paper with a pore size of 2.0 μm. 1.9 g/l dissolved calcium hydroxide was found as per titration method. The calcium hydroxide solution was then adjusted to a temperature of 20° C., prior feeding of said solution into the Mini Spray Dryer B-290 from Büchi. A gas containing 100% by volume of $CO_2$ was then introduced with 6 bar pressure as spray gas to the spray nozzle. The $CaCO_3$ synthesis was controlled by adjusting the spray dryer outlet temperature within 85 and 90° C. The product was recovered in a glass vessel as a powder of ACC.

Example 2

1 000 g of PCC grade high-purity quicklime CaO from Austria was added to 5 l of 40° C. tap water in a stirred slaking vessel. The quicklime was slaked for 30 min under continuous stirring and the resulting slurry of hydrated calcium oxide ("milk of lime") was then screened on a 100 μm screen to remove grit.

The subsequent separation of the dissolved calcium hydroxide containing supernatant was conducted via a vacuum suction filter (Büchner funnel) using a filter paper with a pore size of 2.0 μm. 1.9 g/l dissolved calcium hydroxide was found as per titration method. The calcium hydroxide solution was then adjusted to a temperature of 20° C., prior feeding of said solution into the Mini Spray Dryer B-290 from Büchi. A gas containing 100% by volume of $CO_2$ was then introduced with 2 bar pressure as spray gas to the spray nozzle. The $CaCO_3$ synthesis was controlled by adjusting the spray dryer outlet temperature within 85 and 90° C. The product was recovered in a glass vessel as a powder of ACC.

Figure 2:
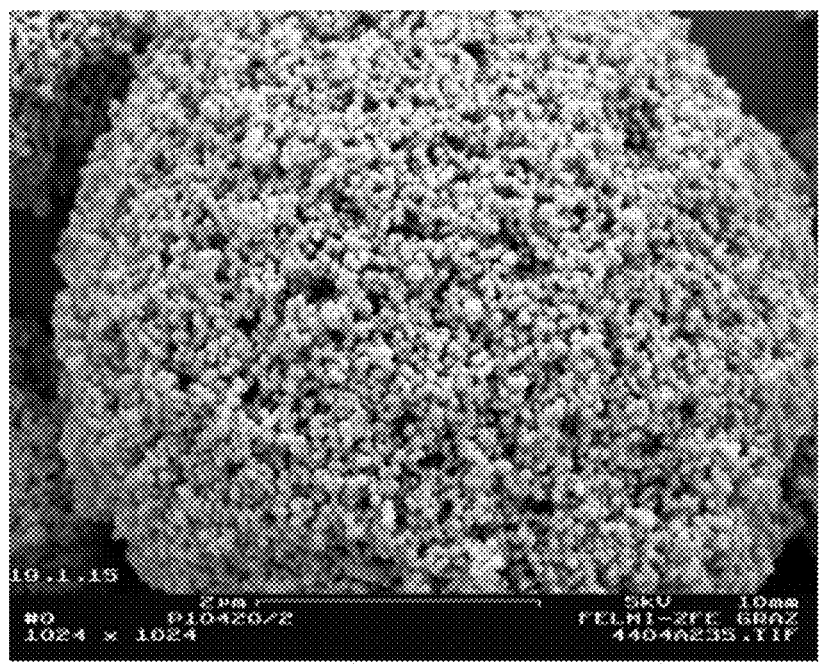
FIG. 2 refers to a SEM image of an amorphous calcium carbonate aggregate.
Figure 3:
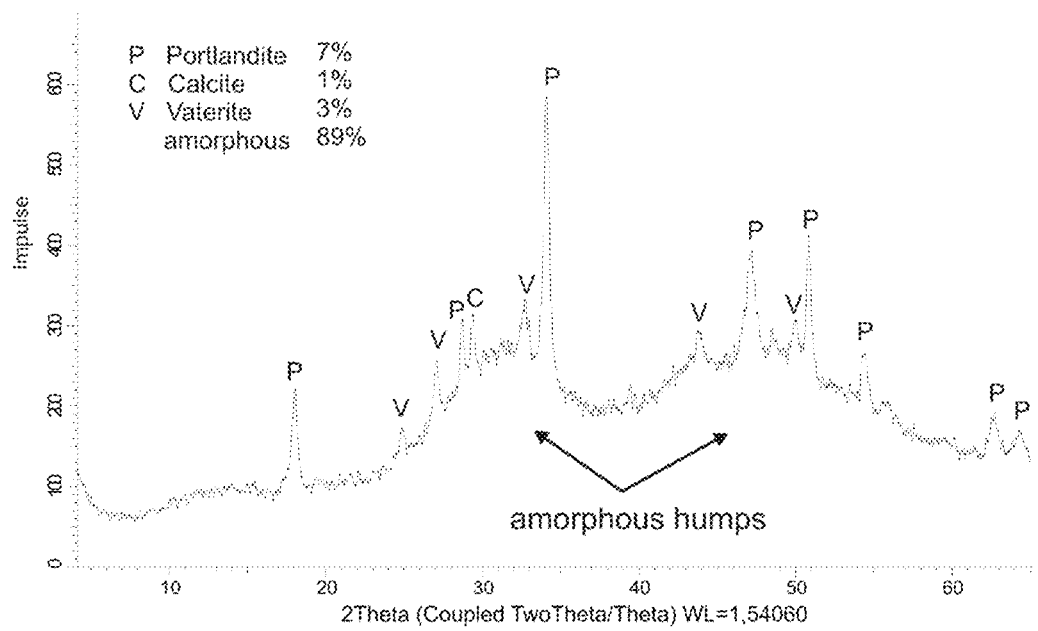
FIG. 3 refers to a XRD analysis of an ACC sample.

SEM images of the obtained ACC samples are shown in FIGS. 1 and 2. XRD analysis was carried out for an ACC sample, which is shown in FIG. 3. ACC samples with 70-90 wt.-% ACC were obtained. XRD analysis of the precipitates showed a broad hump and no discrete peaks, indicating that the investigated samples are lacking a structural ordering, confirming the formation of an amorphous product.

Example 3

1 000 g of PCC grade high-purity quicklime CaO from Austria was added to 5 l of 40° C. tap water in a stirred slaking vessel. The quicklime was slaked for 30 min under continuous stirring and the resulting slurry of hydrated calcium oxide ("milk of lime") was then screened on a 100 µm screen to remove grit.

The subsequent separation of the dissolved calcium hydroxide containing supernatant was conducted via a vacuum suction filter (Büchner funnel) using a filter paper with a pore size of 2.0 µm. 1.9 g/l dissolved calcium hydroxide was found as per titration method. The calcium hydroxide solution was then adjusted to a temperature of 20° C., prior feeding of said solution into the Mini Spray Dryer B-290 from Büchi. A gas mixture containing 20% by volume of $CO_2$ and 80% by volume of air was then introduced with 2 bar pressure as spray gas to the spray nozzle. The $CaCO_3$ synthesis was controlled by adjusting the spray dryer outlet temperature within 85 and 90° C. The product was recovered in a glass vessel as a powder of ACC.

The invention claimed is:

1. A process for preparing amorphous calcium carbonate, the process comprising the steps of:
   a) providing at least one calcium oxide containing material;
   b) providing at least one gaseous $CO_2$ source,
   c) preparing a milk of lime by mixing the at least one calcium oxide containing material of step a) with water to convert the calcium oxide at least partially into dissolved calcium hydroxide,
   d) separating the dissolved calcium hydroxide in the milk of lime obtained in step c) from undissolved materials to obtain a solution of dissolved calcium hydroxide,
   e) drying the solution of dissolved calcium hydroxide obtained in step d), and
   f) carbonating the dissolved calcium hydroxide obtained in step d) with the at least one gaseous $CO_2$ source of step b) to convert the calcium hydroxide at least partially into amorphous calcium carbonate,
   wherein process steps e) and f) are carried out simultaneously.

2. The process according to claim 1, wherein the at least one gaseous $CO_2$ source comprises 50 to 99% by volume $CO_2$.

3. The process according to claim 1, wherein the at least one gaseous $CO_2$ source consists of $CO_2$.

4. The process according to claim 1, wherein the amorphous calcium carbonate produced in element f) has a moisture content of less than or equal to 10 wt%.

5. The process according to claim 1, wherein element d) is performed in with vacuum filter.

6. The process according to claim 1, wherein step c) is carried out in that the at least one calcium oxide containing material is mixed with water in a weight ratio from 1:2 to 1:25 and/or in that the temperature of the water, which is used in step c), is adjusted to be in the range from >0° C. and <100° C.

7. The process according to claim 6, wherein the weight ratio is from 1:3 to 1:15.

8. The process according to claim 1, wherein the process further comprises a step of removing particles having an average particle size of >100 µm from the milk of lime obtained in step c) before separating step d) is carried out.

9. The process according to claim 1, wherein the milk of lime obtained in step c) has a Brookfield viscosity from 1 to 1 000 mPas at 25° C.; and/or solids content in the range from 5.0 to 40.0 wt.-%, based on the total weight of the milk of lime.

10. The process according to claim 9, wherein the Brookfield viscosity at 25° C. of the milk of lime obtained in step c) is from 10 to 600 mPa·s.

11. The process according to claim 9, wherein the solids content of the milk of lime obtained in step c) is from 8.0 to 20.0 wt.-%, based on the total weight of the milk of lime.

12. The process according to claim 1, wherein separating step d) is carried out via mechanical separation techniques.

13. The process according to claim 1, wherein the solution of dissolved calcium hydroxide obtained in step d) is adjusted to a temperature in the range from 10° C. and less than 60° C.

14. The process according to claim 1, wherein drying step e) and carbonating step f) are carried out in a spray drier.

15. The process according to claim 14, wherein the spray dryer has an inlet temperature in the range of 100° C. to 375° C.

16. The process according to claim 1, wherein drying step e) and carbonating step f) are carried out at an inlet temperature in the range from 50° C. to 400° C.

17. The process according to claim 1, wherein the carbonating in step f) is carried out at a gas pressure of 1 to 20 bar.

18. The process according to claim 1, wherein the amorphous calcium carbonate
   i) has an average particle size of 30 to 150 nm, and/or
   ii) has a moisture content of ≤10.0 wt.-%, based on the total dry weight of the amorphous calcium carbonate, and/or
   iii) has a specific BET surface area of 1.0 $m^2/g$ to 60.0 $m^2/g$, and/or
   iv) forms aggregates, and/or
   v) is present in the form of deagglomerated particles.

19. The process according to claim 1, wherein the at least one gaseous $CO_2$ source contains at least 20 vol.-%, based on the total volume of the gas, of $CO_2$.

20. The process according to claim 1, wherein temperature of the water used in step c) is adjusted to be in the range from 35° C. and 45° C.

* * * * *